Jan. 17, 1950           H. W. HUFF           2,495,102

APPARATUS FOR MOLDING TIRE FLAPS

Filed April 15, 1946           4 Sheets-Sheet 1

INVENTOR
HOWARD W. HUFF

BY *Ely & Frye*

ATTORNEYS

INVENTOR
HOWARD W. HUFF
BY
Ely & Frye
ATTORNEYS

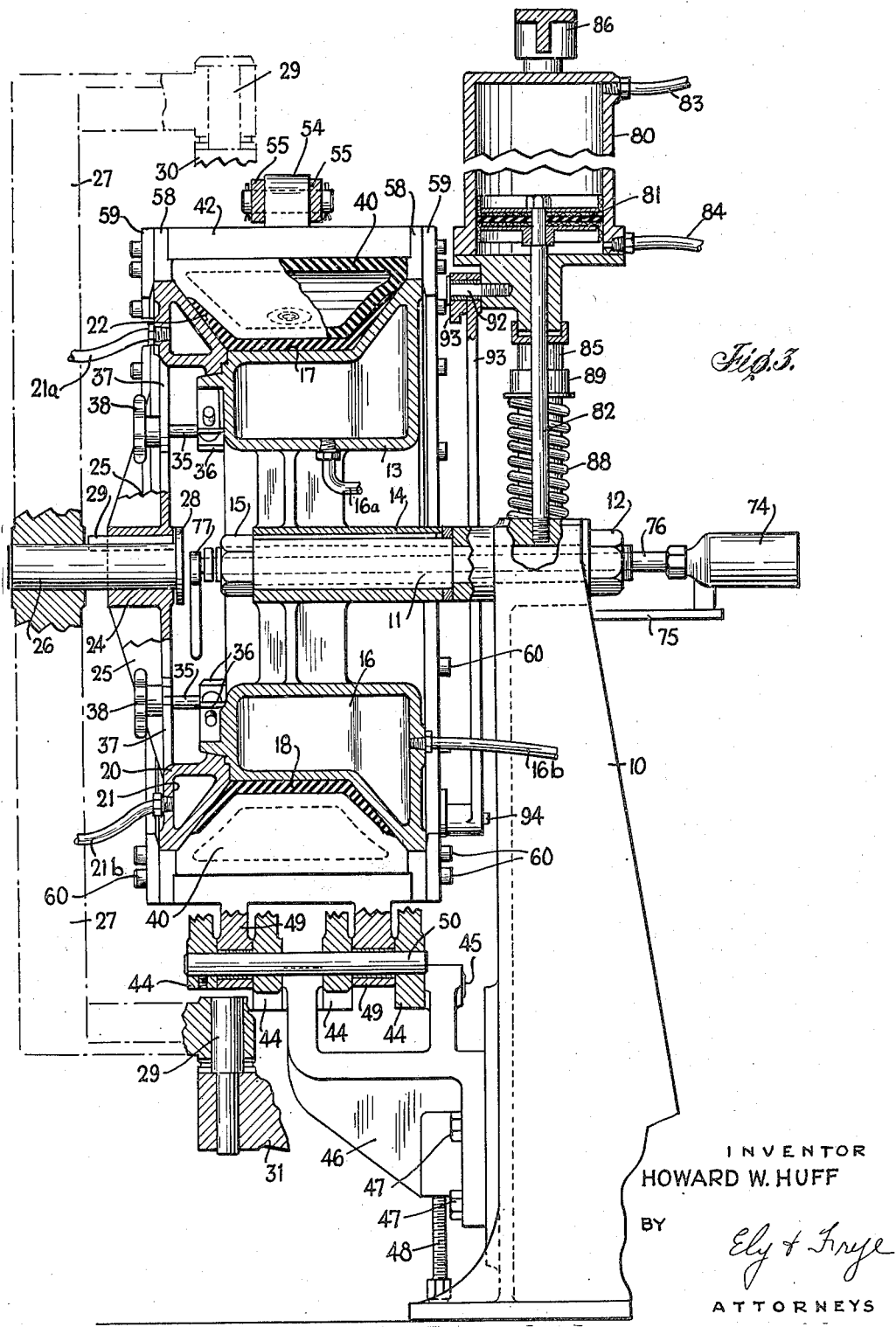

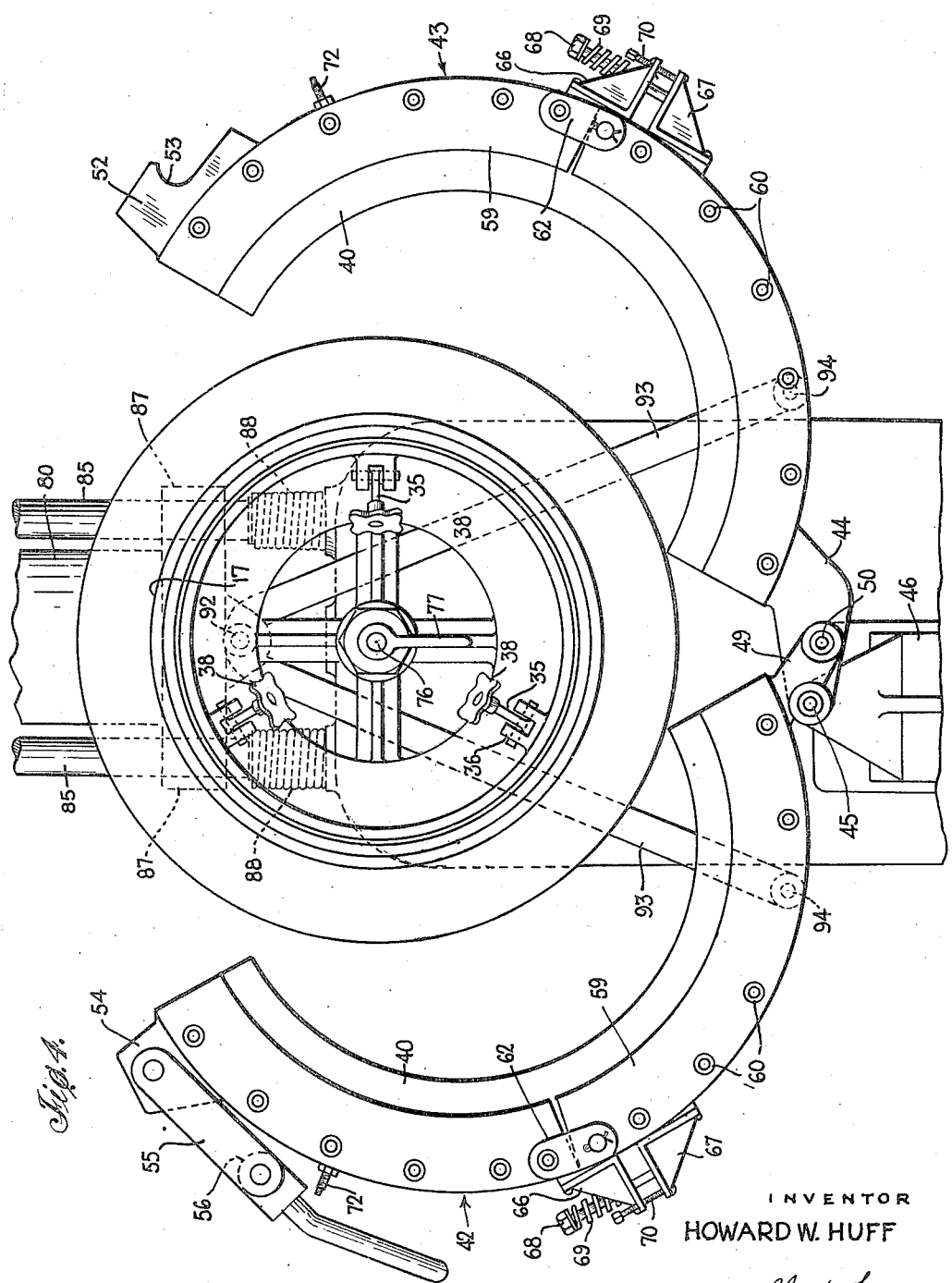

Patented Jan. 17, 1950

2,495,102

UNITED STATES PATENT OFFICE 2,495,102

APPARATUS FOR MOLDING TIRE FLAPS

Howard W. Huff, Akron, Ohio, assignor to The Firestone Tire & Rubber Company, Akron, Ohio, a corporation of Ohio Application April 15, 1946, Serial No. 662,227

3 Claims. (Cl. 18—38)

1

This invention relates to molding devices, and more especially it relates to heating and vulcanizing presses for annular articles composed of vulcanizable material.

The embodiment of the invention herein shown and described, solely for illustrative purposes, is designed for the molding and vulcanizing of tire flaps, especially heavy, large size tire flaps, such as are employed within heavy truck tires between the inner tube of the tire and the rim on which the tire is mounted. Tire flaps of the character mentioned usually are composed of an inferior grade of rubber composition, such as "rag stock," and are covered with textile material; hence the flaps have a substantial amount of flexibility, but little if any elasticity. The flaps are endless, and each is so shaped in section as to define a circumferential groove in the periphery thereof. The thickness of the flap is substantially uniform throughout except at the lateral margins thereof where it tapers to a fine edge. The shape of the flaps is such that they require to be molded in a mold groove that is shaped complemental to the shape of their inner circumferential face. Because of the substantially inelastic character of the composition of which the flaps are composed, great difficulty heretofore has been encountered in mounting the unvulcanized flaps in an endless molding groove, and in the subsequent removal of the vulcanized flaps from said groove. It is to the relief of this condition that this invention primarily is directed.

The chief objects of the invention are to provide in an improved manner for the molding and vulcanizing of endless tire flaps of the character mentioned; to provide an improved molding press for tire flaps; to provide a molding press for tire flaps wherein the latter do not require to be stretched, either in the mounting or the removal thereof; and in general to effect economies of time and labor in the production of tire flaps. Other objects will be manifest as the description proceeds.

Of the accompanying drawings:

Fig. 3 is central vertical section of the device on the line 3—3 of Fig. 2; and

Fig. 4 is a front elevation of the device in its fully open, inoperative condition, parts being broken away.

2

Figure 1:
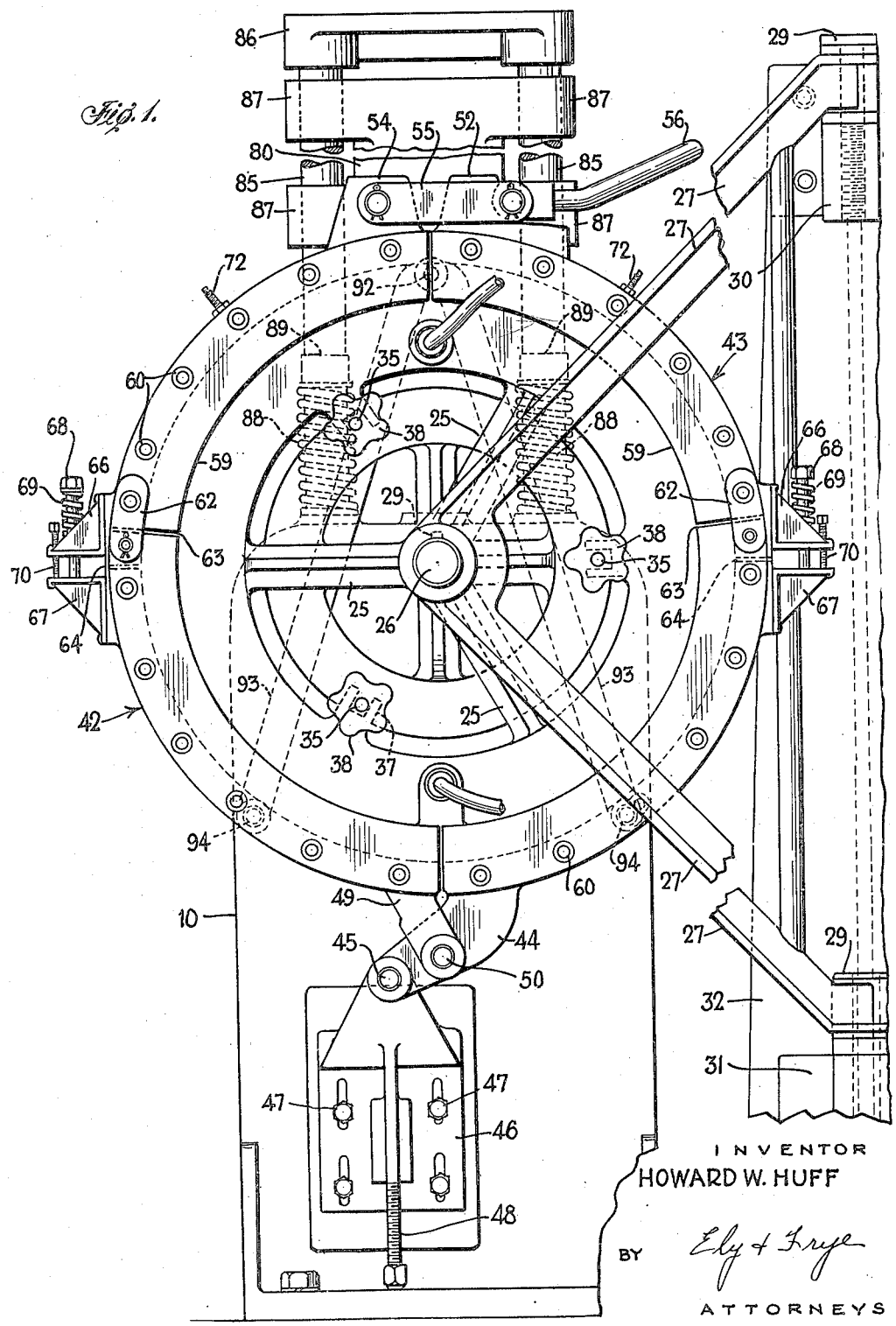
Fig. 1 is a front elevation of a molding device embodying the invention, in closed or operative condition, parts being broken away.

Referring now to the drawings, there is shown a molding device comprising an upright pedestal or standard 10, and projecting forwardly therefrom, substantially at the top thereof, is a non-rotative shaft or spindle 11, the latter extending through the standard and secured in place by a nut 12 threaded upon its rear end portion. The spindle 11 supports an annular, hollow molding element 13 that constitutes a stationary or fixedly positioned rear portion of a sectional tire-flap-vulcanizing mold, said molding element comprising a hub portion 14 that is keyed to the spindle 11 and retained thereon by a nut 15. The hollow portion of the molding element 13 constitutes a steam chamber 16 to which heating fluid may be admitted by any suitable connections, such as the steam inlet pipe 16a and outlet pipe 16b, to supply heat to a tire flap to be vulcanized. The work-receiving portion or molding surface of the molding element 13 is on the periphery thereof and is designated 17. Said molding surface is cylindrical at the front, and flares or inclines rearwardly and radially outwardly at the rear thereof. A tire flap such as is vulcanized in the device is shown at 18; the arrangement being such that the medial region and one of the side portions or wings of the tire flap are received on the molding surface 17.

For effecting the molding and vulcanization of the other side portion or wing of the tire flap 18, the vulcanizing mold is provided with a removable annular front portion 20, which portion is hollow to provide a steam chamber 21, and is formed with a peripheral molding surface 22 that is contiguous with the cylindrical region of mold surface 17 but is sloped reversely with relation to the flared portion of said surface 17; said surfaces 17, 22 constituting a molding groove with outwardly divergent sides. The steam chamber 21 is supplied with heating fluid in the usual manner by a steam inlet pipe 21a and outlet pipe 21b.

The front mold element 20 is formed with an axial hub 24 to which it is connected by radial arms 25. Extending axially through said hub 24 is a stud or pin 26 that is carried by a hinge that comprises a pair of angular arms 27, and which supports said mold element. The hub 24 is retained on pin 26 by a flange or head 28 formed on the projecting end of the latter, said pin being of such length as to enable the hub 24 to have appreciable movement relatively thereof in an axial direction. Rotary or angular movement of the hub 24 on the pin 26 is prevented by a key 29. The hinge arms 27 are pivotally mounted upon respective hinge pins 29 at one side of the apparatus and rearwardly of the front mold element 20, said hinge pins being carried in an upper hinge bracket 30 and a lower hinge bracket 31. Said brackets are mounted upon and project forwardly from a hinge standard 32 that is positioned beside the main standard 10. The arrangement is such that the mold element 20 may be swung from the closed position shown in Figs. 1 to 3 to an open position well beyond that shown in broken lines in Fig. 2. The steam pipes 21a, 21b are arranged to swing with the mold element 20.

In order that the mold element 20 may be forced tightly in juxtaposition with mold element 13 in the closed or operative condition of the mold, a plurality of clamping bolts 35, 35, herein shown as three in number, are pivotally mounted in respective pairs of ears 36 formed on the front wall of the rear mold element 13, said clamping bolts being swingable into parallelism with the axis of the vulcanizing mold, in which position they are received in respective open-end slots in formations 37 on the inner circumference of the mold element 20. The free ends of the bolts 35 are threaded to receive respective manually operated clamp nuts 38, which when set up tightly against said formations 37, force the mold element 20 axially into close engagement with mold element 13, such movement of the mold section being possible by reason of the sliding arrangement of the hub 24 of the mold element upon its supporting pin 26.

For pressing a tire flap 18 firmly into the molding groove constituted by the molding surfaces 17, 22, an expansible curing bag of rubber is provided, said bag consisting of two identical semicircular sections 40, 40. The sections 40 are hollow, and are trapezoidal in transverse section with their inner and outer circumferential surfaces concentric with their respective axes, the concave side of each section being narrower than the convex side thereof. The respective end faces of the sections are flat and radially disposed. The arrangement is such that when said end faces are in juxtaposition the bag sections define a full circle that is adapted to circumscribe the molding element 13 and engage the work (the tire flap 18) mounted upon the periphery thereof, the trapezoidal shape of the sections enabling them to enter the molding groove defined by the molding surfaces 17, 22.

The curing bags 40 are mounted in and carried by respective semi-circular bag holders 42, 43, said curing bags being located on the concave side of said holders. Said holders 42, 43 are mounted for movement between the open inoperative position shown in Fig. 4, and the closed operative position shown in Fig. 1. In the latter position the end faces of the holders abut each other in a vertical plane, the latter disposed diametrically of the device. Adjacent its lower end the holder 43 is formed on its periphery with a plurality of apertured ears 44 that are pivotally mounted upon a pivot pin 45 that is carried by a bracket 46, the latter being secured to the front face of the standard 10 by cap screws 47, the bracket being adjustable vertically by means of an adjusting screw 48. Adjacent its lower end the bag holder 42 is formed with a plurality of apertured ears 49 that are pivotally connected to the ears 44 of holder 43 by means of a pivot pin 50. The arrangement enables the bag holders, 42, 43 to be swung in their own plane from and toward each other. Means for so moving the bag holders presently will be described.

Figure 2:
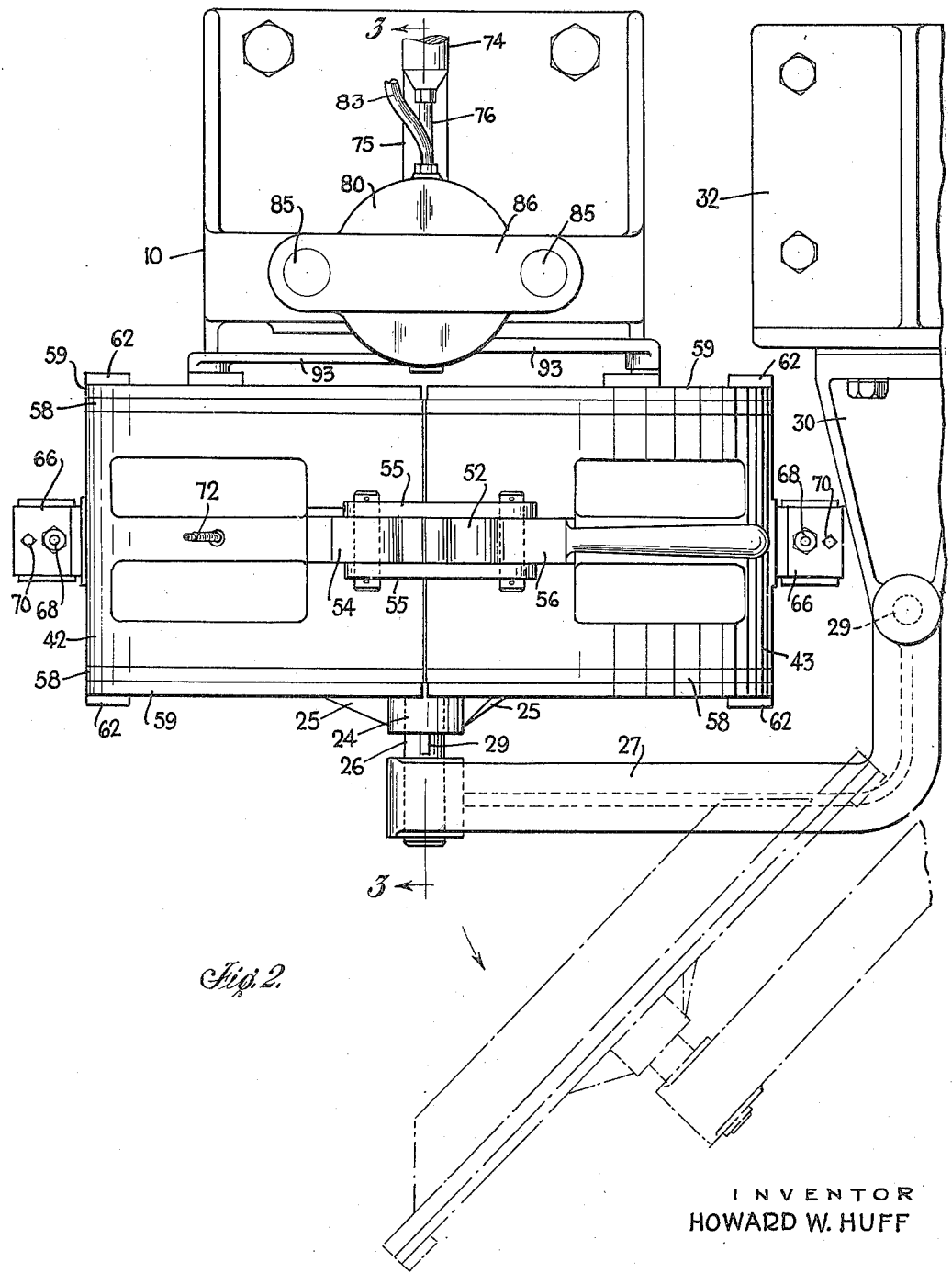
Fig. 2 is a plan view thereof, the open position of one of the elements thereof being indicated in broken lines.

When the bag holders are swung toward each other, in the closed position of the vulcanizer shown in Fig. 1, their free, upper ends may be locked together, and for this purpose a lug 52 is mounted upon the periphery of holder 43 adjacent its free end, said lug formed with a concave cam-receiving surface 53. The free end portion of the bag holder 42 also is formed with a peripheral lug 54 to which is pivotally connected a pair of parallel spaced-apart links 55, 55, that carry a manually operated cam 56 that is pivotally mounted between the free ends of said links. The arrangement is such that when the bag holders 42, 43 are in the closed position shown in Figs. 1, 2, and 3 the cam 56 may be manipulated into the cam-receiving surface 53 and turned angularly to draw the free ends of bag holders 42, 43 toward each other and lock them in closed position.

The bag holders 42, 43 are composite structures, each of which comprises rings 58, 58 at the respective lateral margins thereof, and side plates 59, 59 disposed in juxtaposition to said rings 58, the latter and the side plates being secured to the bag holders by cap screws 60. The inside diameter of the rings 58 is such that they bear upon the peripheral surfaces of greatest diameter of the mold member 13 and mold portion 20 in the closed position of the bag holders. The side plates 59 are of smaller inside radius than the rings 58 and telescope over the aforesaid mold structures in the closed position of the bag holders, as is best shown in Fig. 3, thereby assisting in preventing separation of the mold structure as the result of pressure in the curing bags 40. The bag holders 42, 43 are each divided into sections of about 90° extent, which sections are pivotally connected to each other by respective pairs of links 62, 62. Preferably the main body structure and the rings 58 of each bag holder are divided at a point that is somewhat offset from the line of division of side plates 59 as is best shown in Fig. 1 wherein 63 shows the division between said side plates and 64 indicates the division between the main body structure of the holder and the rings 58. The confronting end portions of the respective sections of each bag holder 42, 43 are provided on the periphery thereof with respective brackets 66, 67. Mounted on each bracket 67 is a headed stud 68 that extends upwardly through an aperture in bracket 66, there being a compression spring 69 mounted upon said stud between the head thereof and the top of bracket 66. A stud 70 threaded through bracket 66 and engaging bracket 67 limits movement of the brackets relatively of each other under impetus of spring 69. The arrangement is such as to provide a modicum of flexibility to the bag holders which facilitates the closing of the latter in a manner that obviates engagement of the pressure bag 40 with the work 18 before the bag holders are substantially closed, whereby drag on the work with resulting distortion thereof is avoided.

As previously stated, the two sections of the pressure bag 40 are carried by the bag holders 42, 43, the perimeters of the bag sections abutting the inner circumferential faces of the main body portions of the holders, the radially outermost lateral portions of the bags abutting the rings 58 of the holders. The pressure bag 40 is arranged to be heated and distended by fluid under pressure, such as steam or hot water, and to this end each bag-section is provided with a filling stem 72 that extends outwardly through a suitable aperture in the main body portion of its bag holder. A nut threaded onto the projecting portion of each filing stem serves to prevent retraction of the said stems, and thereby retains the bag sections in place in their respective holders. Suitable flexible conduits (not shown) are connected to the stems 72 for delivering pressure fluid thereto from a suitable source (not shown). For controlling such pressure fluid, a valve 74, Fig. 3, is provided, which valve is located at the rear of the device upon a bracket 75 that is secured to the standard 10 by the nut 12. The axis of the valve 74 is in alignment with the spindle 11, said valve being provided with a rotatable operating shaft 76 that is journaled in the spindle 11 and extends axially therethrough and is provided with an operating handle 77 at the front end of said spindle. In the closed condition of the device the handle 77 is accessible through the spokes or arms 25 of the front mold element 20.

For moving the bag holders 42, 43 between the closed position of the device shown in Fig. 1 and the open position shown in Fig. 4, suitable power means is provided, namely, a fluid pressure operated cylinder 80. The latter includes a piston 81, and a downwardly extending piston rod 82, the lower end of the piston rod being secured to the standard 10 by being threaded into the top thereof. The arrangement is such that alternate charging and discharging of opposite ends of the cylinder 80 will move said cylinder up and down. Inlet-and-outlet pipes 83, 84 communicating with opposite ends of the pressure chamber of the cylinder 80 furnish the pressure fluid for operating the same. Rising from the top of standard 10, at opposite sides of the cylinder 80, are cylindrical posts 85, 85, the tops of which are connected by a bracket or yoke 86. The cylinder heads at opposite ends of the cylinder 80 are formed with laterally extending apertured ears 87, 87 in which the posts 85 are slidingly received, said posts serving to guide the vertical reciprocatory movement of the cylinder. Resting upon the top of standard 10 about the lower ends of posts 85 are respective compression springs 88, each of which is surmounted by a cap 89. When the cylinder 80 is in its lowermost position as shown in Fig. 4 the ears 87 of the lower cylinder head are in engagement with the caps 89 and the springs 88 are compressed. The arrangement is such that the springs cushion and slow down the descending movement of the cylinder. Pivotally connected at 92 to a boss on the lower cylinder head are two links 93, 93, said links extending downwardly and having their lower ends pivotally connected at 94, 94 to the respective bag holders 42, 43, relatively near the lower pivoted ends thereof. The arrangement is such that vertical reciprocation of the cylinder 80 will swing the bag holders 42, 43 on their pivots 50, 45 to apply the pressure bag sections 40 to the work 18, and to remove them therefrom.

In the operation of the device, the mold member 13 and the mold element 20 are constantly heated. Assuming the device to be in the open, inoperative condition shown in Fig. 4, the first step is to mount an unvulcanized work-unit 18 upon the periphery of mold element 13, which operation readily is accomplished by reason of the absence of mold element 20, which has been swung away from the front of the vulcanizer, as is suggested by Fig. 2 but to a greater extent than shown in said figure. After the work-unit has been mounted as described, the mold element 20 is swung into laterally abutting relation to the mold element 13, and clamped firmly into position by means of the clamp nuts 38, the mold element moving axially on its supporting pin 26 during this operation. The arrangement assures that there will not be the slightest gap between mold elements 13, 20, and the formation of an overflow rand on the work at the juncture of said elements is obviated.

Next, the operator performs the act necessary to effect the charging of the upper end of cylinder 80 while discharging the lower end thereof, with the result that the cylinder rises, and, through the agency of the links 93 connected thereto, swings the bag holders 42, 43 upwardly so that they embrace the mold elements 13, 20, the pressure bag units 40 being received in the molding groove of said mold elements. With the bag holders in elevated position, the free end thereof are adjacent each other so that the operator may engage the cam 56 in the cam-receiving surface 53 and thereby manually force the free ends of the bag-holders more closely together. During this operation the sections of the bag holders move slightly relatively of each other against the force of the springs 69. The apparatus now is in the condition shown in Fig. 1. The final operation consists in operating the valve 74, which is effected by means of the handle 77, to admit heated fluid under pressure to the two sections of the pressure bag 40. Such pressure causes distension of the pressure bag, and forces it radially inwardly against the work unit 18, whereby the latter is pressed and compacted against the heated surface of the molding groove in which it is seated. This condition obtains until vulcanization of the work unit is achieved. The operations described are reversed to open the device and remove the finished work therefrom. This completes a cycle of operation, which may be repeated as desired.

From the foregoing it will be apparent that the work unit is readily mounted in and removed from the device without requiring to be stretched, whereby a superior product is produced, and economies of time and labor are achieved.

Modification may be resorted to without departing from the spirit of the invention, or the scope thereof as defined by the appended claims.

What is claimed is:

1. In a molding device of the character described, the combination of a mold formed with an outwardly open circumferential molding groove in the periphery thereof, a fluid-expansible pressure bag adapted to encircle the mold and so shaped as to extend into said groove to apply heat and pressure to an endless article therein, said bag divided into two semi-circular sections, a pair of semi-circular bag-holders in which the respective bag sections are mounted, said bag holders being pivotally mounted at one of their adjacent ends, and a clamping device for drawing the other ends of the bag-holders together during a molding operation, each of said bag-holders being transversely divided into two sections, which sections are hinged together, including yielding means for urging said sections toward determinate angular relation to each other, whereby the bag therein is flexed out of true semi-circular shape in the inoperative position of the bag-holder.

2. In a molding device of the character described, the combination of a circular mold formed with a radially outwardly facing circumferential molding groove in the periphery thereof, a flexible, fluid-expansible pressure bag adapted to encircle the mold and extend into said groove to apply heat and perssure to an endless article therein, said bag divided into two semi-circular sections, and pivotally mounted bag holders for the respective bag sections, said bag holders comprising hinged segments articulated so that the free end portions thereof may be moved to ultimate operative bag-clamping position after the opposite pivotally mounted end portions thereof have attained ultimate operative bag-clamping position.

3. A molding device of the character described comprising, a mold formed with an endless radially outwardly facing circumferentially extending molding groove in the base thereof, said mold being circumferentially split thereby forming two endless laterally separable sections, rigid sectional means encircling the mold, two semi-circular fluid expansible rubber-like curing bags attached to and projecting radially inwardly from said rigid means which expansible bags are adapted to enter said groove and when subjected to internal pressure and heat to assist in molding and vulcanizing an article in said molding groove, a hinge support for one of said mold sections, the other mold section having a fixed situs.

HOWARD W. HUFF.

REFERENCES CITED

The following references are of record in the file of this patent:

UNITED STATES PATENTS

| Number | Name | Date |
|---|---|---|
| 604,258 | Menier | May 17, 1898 |
| 1,392,487 | Earp | Oct. 4, 1921 |
| 1,417,551 | Midgley | May 30, 1922 |
| 1,559,972 | Midgley | Nov. 3, 1925 |
| 1,707,620 | Kuhlke | Apr. 2, 1929 |
| 1,707,794 | Blaker | Apr. 2, 1929 |
| 1,836,850 | Hudson | Dec. 15, 1931 |
| 1,996,971 | Murphy | Apr. 9, 1935 |
| 2,253,792 | Leavenworth | Aug. 26, 1941 |
| 2,411,687 | James | Nov. 26, 1946 |